United States Patent
Bouquerand

(10) Patent No.: US 8,691,319 B2
(45) Date of Patent: *Apr. 8, 2014

(54) LARGE GLASSY BEADS

(75) Inventor: Pierre-Etienne Bouquerand, Pers-Jussy (FR)

(73) Assignee: Firmenich SA, Geneva (CH)

( * ) Notice: Subject to any disclaimer, the term of this patent is extended or adjusted under 35 U.S.C. 154(b) by 6 days.

This patent is subject to a terminal disclaimer.

(21) Appl. No.: 13/552,115

(22) Filed: Jul. 18, 2012

(65) Prior Publication Data

US 2012/0328732 A1    Dec. 27, 2012

Related U.S. Application Data

(63) Continuation of application No. 11/484,450, filed on Jul. 10, 2006, now Pat. No. 8,227,014, which is a continuation of application No. PCT/IB2005/000145, filed on Jan. 20, 2005.

(30) Foreign Application Priority Data

Jan. 23, 2004    (EP) .................................. 04100251

(51) Int. Cl.
   A23L 1/22      (2006.01)
(52) U.S. Cl.
   USPC ......................................... 426/650; 426/516
(58) Field of Classification Search
   USPC .................................................. 426/650, 516
   See application file for complete search history.

(56) References Cited

U.S. PATENT DOCUMENTS

| | | | |
|---|---|---|---|
| 3,666,496 A | 5/1972 | Honey et al. | 426/96 |
| 3,704,137 A | 11/1972 | Beck | 99/140 R |
| 4,610,890 A | 9/1986 | Miller et al. | 426/651 |
| 4,707,367 A | 11/1987 | Miller et al. | 426/96 |
| 5,124,162 A | 6/1992 | Boskovic et al. | 426/96 |
| 5,273,752 A | 12/1993 | Ayer et al. | 424/438 |
| 5,426,248 A | 6/1995 | Sarama et al. | 568/824 |
| 5,811,148 A | 9/1998 | Chiu et al. | 426/548 |
| 6,190,591 B1 | 2/2001 | van Lengerich | 264/141 |
| 6,468,568 B1 | 10/2002 | Leusner et al. | 426/72 |
| 6,707,771 B2 | 3/2004 | Wade et al. | 369/44.15 |
| 2002/0098157 A1 | 7/2002 | Holme et al. | 424/49 |
| 2002/0187223 A1 | 12/2002 | McIver et al. | 426/96 |
| 2003/0026874 A1 | 2/2003 | Porzio et al. | 426/96 |

FOREIGN PATENT DOCUMENTS

| | | |
|---|---|---|
| WO | WO 99/48372 A1 | 9/1999 |
| WO | WO 00/25606 A1 | 5/2000 |
| WO | WO 00/37044 A1 | 6/2000 |
| WO | WO 03/092412 A2 | 11/2003 |

OTHER PUBLICATIONS http://www.scientificpsychic.com/fitness/carbohydrates1.html, Carbohydrate, 7 pages (no date).

Tate & Lyle, STAR-DRI, maltodextrins and corn syrups, 8 pages (no date).

Igoe et al., Dictionary of Food Ingredients (4th Edition), Springer-Verlag, pp. 44 and 87-88 (Jan. 2005).

http://www.medlabs.com/file.aspx?FileID=107, Polydextrode, 2 pages, print date Oct. 13, 2009.

*Primary Examiner* — Jyoti Chawla

(74) *Attorney, Agent, or Firm* — Winston & Strawn LLP

(57) ABSTRACT

The present invention relates to a particulate composition in the form of a large spherical glassy bead having a cross-sectional diameter greater than 5 mm. The bead comprises an encapsulating carrier composition essentially made of fibrous materials, which are both sugarless and non-cariogenic and an encapsulant, such as a flavor material.

12 Claims, No Drawings

LARGE GLASSY BEADS

CROSS-REFERENCE TO RELATED APPLICATIONS

This application is a continuation of U.S. application Ser. No. 11/484,450 filed Jul. 10, 2006, now U.S. Pat. No. 8,227,014, which is a continuation of International Application No. PCT/IB2005/000145 filed Jan. 20, 2005, the entire content of each of which is expressly incorporated herein by reference thereto.

TECHNICAL FIELD

The present invention relates to the field of encapsulation. It concerns more particularly a novel delivery system capable of releasing an active ingredient such as a flavor and wherein a novel encapsulating carrier composition which is essentially made of fibrous materials, and more particularly of a combination of two particular fibrous polysaccharides enables the preparation, through an extrusion process, of large glassy beads. The solid particulate composition of the invention can constitute a ready-to-consume end product intended for the confectionery area, or be used as a delivery system for a flavor or another active ingredient, when added to a consumer product, for example when added to an edible composition such as a foodstuff or beverage.

BACKGROUND ART

The literature discloses many ways of providing active ingredients in an encapsulated form. The encapsulation of active ingredients has various objectives, the main being, on the one hand, to protect labile or volatile ingredients from a degradation or any adverse interaction with an external element, and on the other hand to control the release of the encapsulated active ingredient and provide an efficient release only when desired, depending on the application.

Encapsulation methods and encapsulating matrix compositions are parameters which can be varied and are chosen as a function of the purpose for which a delivery system is designed. They are the object of many patents or patent applications.

Regarding encapsulation methods, extrusion has been widely described in the prior art, particularly in the patent literature. This method typically relies on the use of carbohydrate matrix materials which are heated to a molten state and combined with an active ingredient, before extruding and quenching the extruded mass to form a glass which protects said ingredient. Typical products issued from this method and used in the flavor industry are dry, granular delivery systems in which the active ingredient is a flavor uniformly distributed as droplets throughout a carbohydrate glass. One significant example of the prior art disclosures in this field is U.S. Pat. No. 3,704,137 which describes an essential oil composition formed by mixing an oil with an antioxidant, separately mixing water, sucrose and hydrolysed cereal solids with dextrose equivalent (DE) below 20, emulsifying the two mixtures together, extruding the resulting mixture in the form of rods into a solvent, removing the excess of solvent and finally adding an anti-caking agent. Another pertinent example is that described in U.S. Pat. Nos. 4,610,890 and 4,707,367 which disclose a process for forming a stable, melt based and extruded, solid, essential oil flavor composition, as well as a product of this process. The melt to be extruded consists, in this particular case, in a matrix formed of an aqueous mixture of a sugar and a starch hydrolysate together with a selected emulsifier, said aqueous mixture being further blended with a selected quantity of essential oil flavor. More recently, U.S. Pat. No. 6,707,771 has described a novel extrusion process wherein the extruded mass is chopped as it exits the die and when it is in a plastic state. This process avoids any drying step following extrusion. The above-mentioned patents are merely illustrative of the considerable volume of patent literature related to extrusion techniques.

Carrier materials described as being suitable for extrusion processes are also numerous. The most useful ingredients are long chain carbohydrates typically including starches, hydrogenated starch hydrolysates, modified starches and gums, in combination with or as alternative of low molecular weight carbohydrates such as mono- or disaccharides, maltodextrins having a dextrose equivalent (DE) in the range of about 4 to 20, and corn syrup solids or polydextrose having a dextrose equivalent in the range of about 21 to 97.

Now, the present invention relates to a novel encapsulating carrier composition essentially made of fibrous polysaccharides and more particularly made of soluble dietary fibres. Dietary fibres are commonly defined as polysaccharides which are resistant to the endogenous enzymes of man, i.e., that they are not digested by the endogenous secretions of the human digestive tract. They are divided into water-insoluble and water-soluble fibres. Water-soluble fibres have been widely described in the prior art because of their known health benefits, as ingredients used in food products, partly because they reduce the glycemic response to food and make thus food products which contain soluble fibres particularly suitable for diabetics. This prior art describes the use of water-soluble fibres as such in ready-to-consume products, but not as potential encapsulating materials.

On the other hand, soluble and insoluble fibres have also been disclosed as being potentially useful to be added in minor amounts to encapsulating compositions to control the release of the encapsulant (PCT publication WO 99/48372).

U.S. Pat. No. 6,468,568 discloses the encapsulation of a mineral such as calcium or a vitamin, in a double encapsulation system containing a fibre material. The active ingredient is firstly surrounded by an edible oil and then encapsulated in a glassy matrix composition including an oligosaccharide, which may be inulin. Inulin is a clean, dried fibrous material which is separated by extraction from, for example, chicory, onions or Jerusalem artichokes and other common plant sources. It is the only totally fibrous material mentioned in this document among other oligosaccharides. All the other oligosaccharide materials suitable for the purpose disclosed herein include sugars. The encapsulation method described in this document is extrusion and allows to obtain a product which is non-rubbery and readily grindable into fine particulate compositions or powders ready for incorporation into or onto food compositions. The glassy matrix compositions described can be extruded through extrusion dies having aperture diameters of from about 0.10 mm to about 5 mm. The diameter of the extrudate rope and product may be larger than the diameter of the die apertures due to deformation or swelling as the composition exits the die. The increase in diameter upon exiting the die may occur without substantial development of an expanded, puffed, foamy, or cellular structure. According to the present invention, we have been able to realise a novel encapsulating carrier composition which, in addition to the fact that it consists essentially of fibrous materials and thus presents advantageous properties such as being sugar-free and non-cariogenic, enables the preparation of a particulate composition with a larger size than disclosed in the prior art, namely with a cross-sectional diameter of at least 3, preferably at least 5 mm and up to 15 mm. The products of the invention are therefore suitable either for direct consumption in applications in the sweet and savoury confectionary area and bakery area where they provide alternative products to known gelatine type candies, or small compressed tablets, or for an use as an efficient delivery system when added to an edible composition such as a foodstuff or beverage.

DISCLOSURE OF THE INVENTION

The present invention relates to a novel particulate composition in the form of a large glassy bead made of an essentially fibrous carrier composition. More particularly, a first object of the invention is a particulate composition in the form of an extruded, glassy bead, comprising a fibrous, carrier composition encapsulating an active ingredient, wherein the bead has a cross-section diameter comprised between 3 mm and 15 mm, preferably between 5 mm and 15 mm, more preferably between 6 mm and 15 mm and is preferably spherical. The size of the bead of the invention is linked to its characteristic carrier composition, which is essentially made of water-soluble fibrous materials, and which comprises more particularly one long-chain water-soluble fibrous polysaccharide and another fibrous material of lower molecular weight. The specific choice of water-soluble fibres constituting the carrier composition of the product of the invention and defined below by their respective average molecular weights and degrees of polymerisation allows, through an extrusion process, to provide a significant relaxation phenomenon of the polymeric carriers at the end of the die of the extruder, leading to, for example, spherical beads with a diameter larger than 3, preferably larger than 4, more preferably larger than 5 mm and even more preferably larger than 6 mm. On the other hand, the nature of the fibrous materials advantageously imparts to the final product qualities such as non-cariogenicity and sugarless nature, which render it particularly useful for the preparation of specific products of the sweet and savoury confectionery area and bakery area, or for an use as a traditional delivery system for flavor or other active ingredients, when added to a ready-to-consume end product.

End consumer products are also objects of the present invention. In particular for the flavor industry, products such as chewy sweets, gummy candies, hard boiled candies, cookies, cakes and baked applications in general and cereal bars, chocolate bars and back-pack dairy can advantageously use the particulate compositions of the invention as flavoring ingredients. Savoury goods can also be flavored with the beads of the invention, for instance noodles or soups. The size of the delivery systems gives an appreciated visual effect in the final application, while providing an efficient protection of the volatile and labile ingredient encapsulated and a controlled release of the latter, i.e. a release occurring only at the time of consumption of the end product. In other words, the products of the invention are used in applications both for their qualities as efficient delivery systems and for their visual aspect which differs from usually used encapsulated systems.

Other benefits and advantages of the product of the invention will become apparent through the detailed description and the examples given below.

The particulate composition of the invention is in the form of an extruded, glassy bead, comprising a fibrous carrier composition encapsulating an active ingredient, wherein the bead has a cross-section diameter comprised between 3 mm and 15 mm, preferably between 5 mm and 15 mm, more preferably between 6 mm and 15 mm and the carrier composition comprises from 1 to 70% by weight of a first water-soluble fibrous polysaccharide having an average molecular weight higher than 10,000 Dalton (Da) and an average degree of polymerisation higher than 60, and from 30 to 99% of a second water-soluble fibrous polysaccharide having an average molecular weight below 10,000 Da and an average degree of polymerisation below 60, percentages being given by weight relative to the total weight of the carrier composition.

The term water-soluble polysaccharide means that the polysaccharide is at least 50% soluble according to the method described by L. Prosky et al., J. Assoc. Off. Anal. Chem. 71, 1017-1023 (1988). As was mentioned before, the term fibre or fibrous polysaccharide refers to the fact that the polysaccharide cannot be digested or hydrolysed by the endogenous secretions of the human digestive tract. Accordingly, the term non-fibrous polysaccharide means that the polysaccharide can be digested by the endoenuous secretions of the human digestive tract.

The particulate composition comprises a specific encapsulating carrier which is essentially made of fibres. The term "carrier", also referred to as "matrix", is commonly used in the encapsulation art to designate the encapsulating composition in a delivery system, i.e. the composition wherein the active ingredient to be protected is entrapped. While fibrous materials have sometimes been mentioned as being possibly added to an encapsulating composition, in particular to control the release of the encapsulant, a specific combination of fibrous materials allowing the preparation by extrusion of beads of the size defined in the present invention has never been described. More particularly, the only document from the prior art which, to our knowledge, encompasses the possibility of having a carrier entirely made of a fibre (such embodiment being however non exemplified in U.S. Pat. No. 6,468,568), only allows to prepare a particulate composition of a common size for extruded products, i.e. smaller than 5 mm. Now, in the present invention, we have been able to establish that a specific combination of water-soluble fibrous materials defined by means of average molecular weights and degrees of polymerisation, allows to prepare a melt that can be extruded and, thanks to a relaxation phenomenon of the polymeric polymers at the exit of the extruder, to prepare large beads, in particular spherical beads with a cross-sectional diameter higher than 3 mm, preferably higher than 4 mm, more preferably higher than 5 mm. Sugars such as mono- and disaccharides commonly used in large proportions in carrier compositions to be extruded prevent significant polymer relaxation. The carrier composition encapsulating the active ingredient in the present invention is advantageously free of this type of compounds and can thus be described as being sugarless.

The first water-soluble polysaccharide present in the carrier or encapsulating composition of the product of the invention is a soluble fibre having an average molecular weight higher than 10,000 Dalton (Da) and an average degree of polymerisation higher than 60. This long-chain polymer is present in proportions varying between 1 and 70% by weight, relative to the total weight of the carrier composition, preferably between 2 and 50%, more preferably between 8 and 20% by weight, for example between 2 and 20% by weight. In a particular embodiment of the invention, it is chosen from the group consisting of konjac mannan, xanthan, gum Arabic, guar gum, pectin, locus bean gum, soluble soyabean polysaccharide and beta-glucan.

The second water-soluble polysaccharide present in the carrier composition of the bead is a fibre with a smaller molecular weight. In particular, the latter has an average molecular weight below 10,000 Da and an average polymerisation degree below 60. Typically, it is a dextrin. It is comprised in proportions varying between 20 and 99%, for example, between 30 and 99%, by weight and preferably between 50 and 98%, for example between 80 and 98% by weight relative to the total weight of the carrier composition. A particularly suitable dextrin for the invention has a Chemical Abstract Registry Number of 9004-53-9. This material is commercially available from Roquette Freres as Nutriose FB®, marketed as a new soluble dietary fibre offering good digestive tolerance, acid and heat resistance, and bulking effect for sugar-free products. To the best of our knowledge, no use of this material as an advantageous encapsulating material for the preparation of an extruded delivery system has been described up to now.

Preferably, the carrier composition comprises less than 20 wt. % of non-fibrous polysaccharides, more preferably less than 10 wt. %, even more preferably less than 5 wt. % of non-fibrous polysaccharides. Most preferably, it is free of non-fibrous polysaccharides.

Preferably, the first and/or the second polysaccharide are non-cariogenic. More preferably, both polysaccharides are non-cariogenic.

In an embodiment of the present invention, the carrier composition is sugarless and/or non-cariogenic.

Preferably, the carrier composition has a low glycemic index, that is a glycemic index below 55. More preferably, the glycemic index of the carrier composition is below 40, most preferably it is below 25.

In addition to these essential main components of the encapsulating material, the carrier may comprise a plasticizer, typically in proportions varying between 1 and 10% by weight relative to the total weigh of the particulate composition. Plasticizers commonly used in extrusion techniques suit the invention and are well known to a person skilled in the art. They include, while not being limited to, water, propylene glycol, isomalt, glycerol, ethylene glycol, dipropylene glycol, triacetine, organic acids and mixtures thereof.

The carrier composition can also comprise optional ingredients, such as colorants or emulsifiers. Typical examples of emulsifiers include lecithin, citric esters of fatty acids, but other suitable emulsifiers are cited in reference texts such as Food emulsifiers and their applications, 1997, edited by G. L. Hasenhuettl and R. W. Hartel. A more detailed description of these ingredients is not necessary in the present case as these ingredients are commonly used during the extrusion of any carrier composition and are well known by a skilled person in the art.

The carrier composition of the invention encapsulates an active ingredient preferably comprised in proportions varying between 0.01 and 15% by weight, more preferably between 0.05 and 3% by weight, relative to the total weight of the particulate composition. The active ingredient protected in the delivery system of the invention can be as varied as flavors, fragrances, vitamins, drugs or coloring materials, for example. In an embodiment of the present invention, the active ingredient is selected from the group consisting of a flavor, a fragrance, a vitamin, a drug, a colorant, a nutraceutical, a whitening agent, an antibacterial agent, and a mixture comprising at least two of these. The active ingredient may be a volatile or a labile component which may be in liquid or solid form. Preferably, the active ingredient is hydrophobic. For example, it is a flavor or fragrance ingredient or composition. The terms "flavor or fragrance ingredient or composition" as used herein are deemed to define a variety of flavor and fragrance materials of both natural and synthetic origin. They include single compounds and mixture. Specific examples of such components may be found in the current literature, e.g. in Perfume and Flavour Chemicals by S. Arctander, 1969, Montclair N.J. (USA); Fernaroli's Handbook of Flavour Ingredients, 1975, CRC Press or Synthetic Food Adjuncts, 1947, by M. B. Jacobs, van Nostrand Co., Inc and are well known to the person skilled in the art of perfuming, flavoring and/or aromatising consumer products, i.e. of imparting an odor and/or a flavor or taste to a consumer product traditionally perfumed or flavored, or of modifying the odor or taste of said consumer products.

Natural extracts can also be encapsulated into the system of the invention; these include e.g. citrus extracts such as lemon, orange, lime, grapefruit or mandarin oils, or coffee, tea, cocoa, mint, vanilla or essential oils of herbs and spices, amongst other.

A nutraceutical may also be an active ingredient of the particulate composition of the invention. Nutraceuticals are compounds, ingredients or a dietary supplement or a food that has health and medical benefits, including the prevention and treatment of disease. Nutraceuticals include antioxydants, amino acids and proteins, botanicals, probiotics, nutritional fats (for example, polyunsaturated fatty acids PUFAs), soy, vitamins, and minerals. For example, the nutraceutical may be DHA, which has the beneficial effect of reducing the occurrence of cardio-vascular diseases.

Examples for whitening agents are baking soda, hydrogen peroxide and papain. Examples of antibacterials are triclosan, pyrophosphate, propolis and natural essential oils. The active ingredient may also be an ingredient for treating or preventing bad breath or breath malodor, for example green tea or parsley oil, or an antiplaque agent, for example tetra and bi-natrium, tetra and bi-potassium.

Furthermore, the active ingredient may be a mixture comprising different ingredients, for example it may be a mixture comprising different flavors. In an embodiment of the present invention, the active ingredient is a mixture comprising a flavor and a nutraceutical.

A process for the preparation of the particulate composition of the invention is also an object of the present invention. The process comprises the steps of combining and blending the active ingredient to be encapsulated with a carrier composition comprising from 1 to 70% by weight of a first water-soluble fibrous polysaccharide having an average molecular weight higher than 10,000 Da and an average degree of polymerisation higher than 60, and from 30 to 99% of a second water-soluble fibrous polysaccharide having an average molecular weight below 10,000 Da and an average degree of polymerisation below 60, percentages being given by weight relative to the total weight of the carrier; heating said blend within a screw extruder to a temperature comprised between 80° C. and 120° C. to form a molten mass; then extruding the molten mass through a die having a die hole diameter comprised between 4 and 12 mm; and cutting the material obtained as it exits the die. Typical conditions for this process are those commonly used in the art and are well know by a skilled person, they thus do not need a more detailed description here. Specific conditions will be exemplified below.

The apparatus suitable for carrying out the process of the invention is a single or twin screw extruder. It allows to continuously mix the ingredients and subsequently extruding the composition through an extrusion die plate. The extrusion dies suitable for the invention have hole diameters of from about 2 mm to about 12 mm, preferably from about 3 mm to about 10 mm, for example from about 4 mm to about 12 mm, generally less than 7 mm. The extruded particulate composition, due to its specific carrier composition, is subjected to a significant relaxation phenomenon at the end of the die, which allows to produce an extruded rope having a cross-sectional diameter larger than 3 mm, 4 mm, 5 mm, or 6 mm, for example, and which can be as large as about 15 mm. The process of the invention thus allows to prepare beads, preferably with a spherical shape, presenting such cross-sectional diameter, which was not possible up to now. In fact, spherical particles prepared by extrusion have already been described, but they had much smaller sizes. The spherical shape of the beads should not be intended as limiting the invention. In fact, by varying the die shape and the moment when the extruded rope is cut, other bead shapes can be obtained by the process of the invention, for instance bean-type shapes.

The product obtained by the process of the invention is a solid particulate composition, in a glassy state. More particularly the bead of the invention has a glass transition temperature, Tg, above room temperature, namely above a temperature usually comprised between 18 and 25° C. The product is thus in a brittle form, which gives it a so-called "crunchy" character when consumed or used.

The particulate composition of the invention can be used in many fields of application. First of all, in the flavor industry, the large beads here-described can be used in many ready-to-consume products, as a flavoring ingredient, or even as constituting an end-product itself. In fact, the carrier composition has, as a consequence of its specific fibrous composition, the properties of being non-cariogenic and sugarless or even sugar-free. By non-cariogenic, one designates a product which shows lower acidification by bacteria from the mouth than classical sugar such as saccharose, glucose and fructose. These properties render the carrier composition particularly useful in applications in the food area where it is desired to have tooth-friendly, non-cariogenic and sugarless or even sugar-free products, for instance for products intended to the confectionery field. In this area and thanks to its size, the particulate composition of the invention constitutes an advantageous alternative to existing edible delivery systems such as gelatine type candies, small compressed tablets or coated compressed tablets. On the other hand, if it is desired to modify the release condition of the active ingredient, the particulate composition of the invention can also be subjected to a coating, for example by means of a wax. The coating may then be flavored itself with a flavor different from the encapsulated one, thus providing a "dual release", i.e. the perception of various flavor tonalities during consumption by sucking.

On the other hand, large beads of the invention can also be used as a flavor delivery system, the main advantage being its size and bursting effect in application, in addition to the visual appeal. The system is added to a composition in order to improve, enhance or modify the organoleptic properties of a great variety of edible end products.

Thus, the method of using the specific combination of fibrous materials as a novel carrier composition for the preparation of a delivery system is another object of this invention, as carriers known and used up to now, did not allow to produce by extrusion a product of the present quality and with the claimed dimensions and shapes.

Typical products possibly flavored by means of the beads of the invention include, but are not limited to a baked product, for example a cake or a cookie, a hard-boiled candy, a gummy candy, a chewy sweet, a chewing gum, a cereal bar, a soup, noodles or savoury snacks. Of these, a hard boiled candy having a spherical form is preferred.

When the active ingredient encapsulated in the particulate composition here-described is a perfume, the beads thus prepared are suitable for applications for instance in functional perfumery, for products such as bath salts, shower or bath gels, shampoos, conditioners or other hair-care products, deodorants and antiperspirants, as well as air fresheners, detergents and fabric softeners.

The concentrations in which the extruded beads can be incorporated in such consumer products vary in a wide range of values, which are dependent on the nature of the product to be flavored or perfumed, or to which is it desired to add a vitamin or a dye. Typical concentrations, to be taken strictly by way of example, are comprised in the range of values as wide as from a few ppm to 5 or even 10% of the weight of the composition or finished consumer product into which they are included.

EXAMPLES

The invention will now be illustrated by way of the following examples but is not limited to these examples. Temperatures are given in degrees centigrade and abbreviations have the meaning common in the art.

Examples 1-4

Particulate Composition According to the Invention with Different Flavors

Example 1

Particulate Composition According to the Present Invention with Menthol Flavor and Use Thereof as a Sugarless, Non-Cariogenic Candy A particulate composition was prepared with the following ingredients:

| Ingredients | weight (g) |
| --- | --- |
| NUTRIOSE FB ®[1] | 838.00 |
| Gum Arabic | 129.90 |
| Menthol Nat[2] | 12.01 |
| Acesulfam K | 3.50 |
| Aspartame | 6.54 |
| Dye | 0.05 |
| Emulsifier | 10.00 |
| Total | 1000.00 |

[1] origin: Roquette Freres, France
[2] ref number 957789; origin: Firmenich SA, Geneva, Switzerland The ingredients mentioned above were mixed together so as to produce a dry blend. This powder blend was then extruded with 4% water added, at a throughput of 6 kg/h through a 4 mm die hole using a twin screw extruder equipped with a cutterknife allowing to chop the melt at the die exit while it is still plastic. At the low water content needed to guarantee a glass transition above 40° C. at constant sample composition, the temperature of the melt in the front plate was of 100° C. and the plastic pressure in the extruder was preferably kept higher than $3 \times 10^5$ Pa and below $30 \times 10^5$ Pa.

There were obtained spherical beads with a cross-sectional diameter of 6 mm, and a glass transition temperature of 56° C.

The product constitute a ready-to-consume non-cariogenic, and sugar-free crunchy candy having a menthol flavor.

Example 2

Particulate Composition with Lemon Flavor

A particulate composition was prepared with the following ingredients:

| Ingredients | weight (g) |
| --- | --- |
| NUTRIOSE FB ®[1] | 807.00 |
| Gum Arabic | 130.34 |
| Lemon flavor[2] | 7.00 |
| Acid citric | 14.98 |
| Acesulfam K | 3.43 |
| Aspartame | 6.55 |
| Yellow dye | 0.70 |
| Emulsifier | 10.00 |
| Lemon juice[3] | 20.00 |
| Total | 1000.00 |

[1] origin: Roquette Freres, France
[2] ref number 505594 A; origin: Firmenich SA, Geneva, Switzerland
[3] ref number 925714; origin: Firmenich SA, Geneva, Switzerland The ingredients mentioned above were mixed together so as to produce a dry blend. This powder blend was then extruded with 4% water added, at a throughput of 6 kg/h through a 4 mm die hole using a twin screw extruder equipped with a cutterknife allowing to chop the melt at the die exit while it is still plastic. At the low water content needed to guarantee a glass transition above 40° at constant sample composition, the temperature of the melt in the front plate was of 92° and the plastic pressure in the extruder was preferably kept higher than $3 \times 10^5$ Pa and below $30 \times 10^5$ Pa.

There were obtained spherical beads with a cross-sectional diameter of 6 mm, and a glass transition temperature of 50°.

Example 3

Chocolate Flavored Particulate Composition of to the Present Invention

A particulate composition was prepared with the following ingredients:

| Ingredients | weight (g) |
| --- | --- |
| NUTRIOSE FB ®[1] | 756.00 |
| Gum Arabic | 129.95 |
| Vanillin | 7.05 |
| Acesulfam K | 3.53 |
| Aspartame | 6.47 |
| Emulsifier | 10.00 |
| Chocolate flavor[2] | 50.00 |
| Caramel powder colorant | 37.00 |
| Total | 1000.00 |

[1] origin: Roquette Freres, France
[2] ref number 505899 T; origin: Firmenich SA, Geneva, Switzerland The ingredients mentioned above were mixed together so as to produce a dry blend. This powder blend was then extruded with 3% water added at a throughput of 6 kg/h through a 4 mm die hole using a twin screw extruder equipped with a cutterknife allowing to chop the melt at the die exit while it is still plastic. At the low water content needed to guarantee a glass transition above 40° C. at constant sample composition, the temperature of the melt in the front plate was of 90° C. and the plastic pressure in the extruder was preferably kept higher than $3 \times 10^5$ Pa and below $30 \times 10^5$ Pa.

There were obtained spherical beads with a cross-sectional diameter of 6 mm, and a glass transition temperature of 44° C.

Example 4

Tutti Frutti Flavored Particulate Composition

A particulate composition was prepared with the following ingredients:

| Ingredients | weight (g) |
| --- | --- |
| NUTRILOSE FB ®[1] | 839.99 |
| Gum Arabic | 130.00 |
| Tutti frutti flavor composition[2] | 5.00 |
| Citric acid | 5.00 |
| Acesulfam K | 3.50 |
| Aspartame | 6.50 |
| Emulsifier | 10.00 |
| Dye | 0.01 |
| Total | 1000.00 |

[1] origin: Roquette Freres, France
[2] ref number 51880 A; origin: Firmenich SA, Geneva, Switzerland Following the same procedure as given in Example 3, there were obtained spherical beads with a cross-sectional diameter of 6 mm, and a glass transition temperature of 44° C.

Examples 5-8

Food Applications Comprising the Particulate Composition of the Invention

Example 5

Baked Cake Flavored with a Particulate Composition of the Invention

A cake was prepared with the following ingredients:

| Ingredients | weight (g) |
| --- | --- |
| Part A | |
| Flour | 75.00 |
| Beatreme SE[1] | 75.00 |
| Granulated sucrose | 57.50 |
| Baking powder | 4.50 |
| Corn starch | 2.50 |
| Salt | 0.50 |
| Part B | |
| Particulate chocolate composition as described in Example 3 | 1.30 |
| Particulate lemon composition as described in Example 2 | 1.30 |

[1] spray-dried powder of partially hydrogenated soybean oil, non-fat milk and mono- and diglycerides Preparation The ingredients of Part A and Part B were dry blended, an egg as well as 600 ml of milk were added to the dry blend and mixed together. The cake mass was then poured in an empty mould. The cake was baked in an oven at 190°, until well baked (about 50 min).

The delivery systems were still intact after baking Flavor strength was stronger than in the control samples prepared directly from the corresponding chocolate and lemon liquids as iso-loads. In contrary to the control samples, the flavor profiles were preserved in the baked applications. The integrity of the novel delivery systems allowed dual flavor release whereas the taste of the control samples was a chocolate-lemon blend.

Example 6

Sugar-Free Hard-Boiled Candy Comprising the Particulate Composition of the Present Invention In a copper pan, 100 g of isomalt and 30 g of water are added. The gas frame is turned on and the contents of the copper pan are heated to 165° C. under stirring. Care should be taken as to avoid crystallisation in hard boiled candy. At 165° C., the copper pan is removed from the frame and placed in a water bath at 40° C., and removed after a few seconds. When the temperature has reached 135° C., citric acid (at 0.8 wt. % of the candy solution) and liquid flavors (0.5 wt. % of the candy solution) are added.

Meanwhile, particles of the particulate composition obtained in Example 2 were added to empty ejector-pins of a TEFLON®-mold. The cooked syrup including citric acid and flavors was mixed with a spatula and, at room temperature and less than 40% relative humidity, poured into ejector-pins of the TEFLON®-mold comprising the particles. After solidification, the hard-boiled candies are manually ejected from the pins.

In this way, sugar-free hard-boiled candy comprising extruded particles based on fiber and comprising lemon flavors were obtained.

Example 7

Gummies Comprising the Particulate Composition of the Present Invention

| Ingredients | weight (g) |
| --- | --- |
| Part A: | |
| Gelatine (Bloom no. 250) | 240 |
| Water | 800 |
| Part B: | |
| Water | 600 |
| Granulated sucrose | 1200 |
| Glucose syrup 42 DE (85 brix) | 1600 |
| Part C: | |
| Citric acid | 40 |
| Part D: | |
| Particle obtained in Example 2 | 3 |

800 g water are put in a large PYREX® beaker. Slowly, 240 g of gelatine are added to the water. The gelatine-water solution is mixed until dissolution of all lumps and allowed to swell for 20 minutes. Thereafter it is placed in a water bath (60° C.) until further use (part A).

Separately, a starch tray with a selected impressions (molds) was prepared.

In a copper pan, 1600 g of glucose syrup 42DE are added, followed by 1200 g of granulated sucrose and 600 g of water. The contents of the copper pan were heated to 112° C. by a gas frame under mixing (part B). Thereafter, the copper pan was placed in a water bath (40° C.) and cooled down to 100° C. by slowly mixing with a spatula. At 100° C., the gelatine solution (part A) is added and mixed well with the a wire mixer. Then, the citric acid (part C) is added and mixed into the cooked syrup.

In a 500 ml PYREX® beaker, 297 g of the gelatine-cooked syrup (above) and 3 g of the particles of Example 3 (chocolate) are mixed with a spatula and poured into a hot stainless steel depositor and, from there, carefully deposited in each of the empty moulds of the starch tray. The flavored gelatine-cooked syrup is allowed to dry at 25° C. with less than 40% relative humidity for 24 hours. Then, gelatine candies are removed from the starch tray, placed in a sieve, rinsed with cold water, dried on a perforated stainless steel tray for 4 hours and coated with bee wax to prevent sticking together.

Example 8

Sugar-Free Bubble Gum Comprising the Particulate Composition with Tutti Frutti Flavor

| Ingredients | weight (g) |
| --- | --- |
| Part A (bubble gum): | |
| Mistral-T gum base (Cafosa Gum Base Co., Spain) | 75.24 |
| Crystalline sorbitol powder | 159.24 |
| LYCASIN ® 75% Maltitol solution | 54.18 |
| Glycerine* | 10.53 |
| Aspartame | 0.24 |
| Total (bubble gum only) | 300.00 |
| Part B (Particles of Example 4) | 3 |

Crystalline sorbitol and aspartame are dry blended to form a powder of blended sweeteners. Half of the sweeteners blend is added to a SIGMA® blade mixer equipped with heated water jacket at temperature about 50-55° C. Separately, the gum base is heated for softening, added to the blade mixer and mixed with the powdered sweeteners for 2 minutes. The remaining powder of blended sweeteners and a humectant syrup (LYCASIN®, Glycerine, Aspartame) is added to the mixer and mixed for at least 7 more minutes. The total mixing time was 12 minutes.

The particulate composition comprising a tutti frutti flavor as active encapsulate ingredient (3 g) was added and mixed to the unflavored chewing gum base (300 g). The flavored gum was then formed by passing through a sheeter machine (Seewer Rondo, Burgdorf, Switzerland), and cut into the large cubicle shapes typical of bubble gum products.

In this way, a sugar-free, non-cariogenic bubble gum was obtained, comprising the particulate composition of the present invention.

What is claimed is:

1. A particulate composition in the form of an extruded, glassy bead, comprising a fibrous carrier composition encapsulating an active ingredient, wherein the bead has a cross-section diameter comprised between 3 mm and 15 mm, and the carrier composition comprises from 2 to 70% by weight of a first water-soluble fibrous polysaccharide having an average molecular weight greater than 10,000 Daltons and an average degree of polymerisation greater than 60, and from 30 to 98% of a second water-soluble fibrous polysaccharide having an average molecular weight of less than 10,000 Daltons and an average degree of polymerisation of less than 60, with the percentages being defined by weight relative to the total weight of the carrier composition; wherein the first water-soluble fibrous polysaccharide is selected from the group consisting of konjac mannan, xanthan, gum Arabic, guar gum, pectin, locust bean gum, soluble soybean polysaccharide and beta-glucan and mixtures thereof, and wherein the second water-soluble fibrous polysaccharide is a dextrin.

2. The particulate composition according to claim 1, in which the bead has a cross-section diameter comprised between 5 mm and 15 mm.

3. The particulate composition according to claim 1, in which the carrier composition is sugarless or non-cariogenic.

4. A foodstuff or beverage comprising, as part of an edible composition, a particulate composition according to claim 3.

5. A foodstuff according to claim 4, in the form of a baked product, a hard candy, a gummy candy, a chewy sweet, a chewing gum, a cereal bar, a soup, noodles or a savoury snack.

6. A foodstuff according to claim 4 in the form of a spherical hard candy.

7. A particulate composition according to claim 1, wherein the active ingredient is selected from a flavor, a fragrance, a vitamin, a drug, a colorant, a nutraceutical, a whitening agent, an antibacterial agent, and mixtures thereof.

8. A particulate composition according to claim 1, wherein the active ingredient consists of a flavor ingredient or composition.

9. A particulate composition according to claim 1, wherein the active ingredient is present in an amount of from 0.01 to 15% by weight relative to the total weight of the composition.

10. A method for the preparation of a particulate composition as defined in claim 1, comprising the steps of:

a) combining and blending an ingredient to be encapsulated with a carrier composition comprising from 2 to 70% by weight of a first water-soluble fibrous polysaccharide having an average molecular weight higher than 10,000 Daltons and an average degree of polymerisation higher than 60, and from 30 to 98% of a second water-soluble fibrous polysaccharide having an average molecular weight below 10,000 Daltons and an average degree of polymerisation below 60, percentages being given by weight relative to the total weight of the carrier composition, wherein the first water-soluble fibrous polysaccharide is selected from the group consisting of konjac mannan, xanthan, gum Arabic, guar gum, pectin, locust bean gum, soluble soybean polysaccharide and beta-glucan and mixtures thereof, and wherein the second water-soluble fibrous polysaccharide is a dextrin;

b) heating said blend within a screw extruder to a temperature within the range of from 80° C. to 120° C. to form a molten mass;

c) extruding the molten mass through a die having a die hole diameter comprised between 4 and 12 mm; and d) cutting the material obtained as it exits the die.

11. The composition of claim 1 which is free of mono- and disaccharides.

12. The composition of claim 1 which is sugarless or non-cariogenic.

* * * * *